Dec. 1, 1959          H. J. KLEIN          2,915,262
VORTEX INHIBITOR FOR AIRCRAFT JET ENGINES
Filed Sept. 26, 1957          2 Sheets-Sheet 1
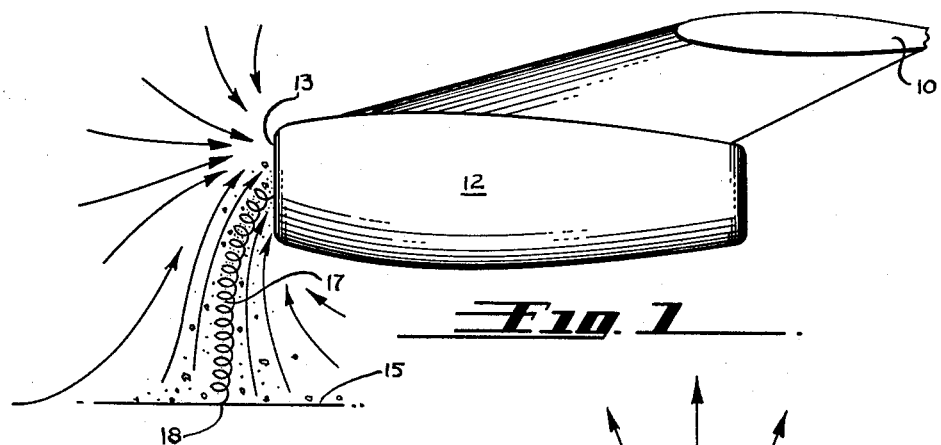
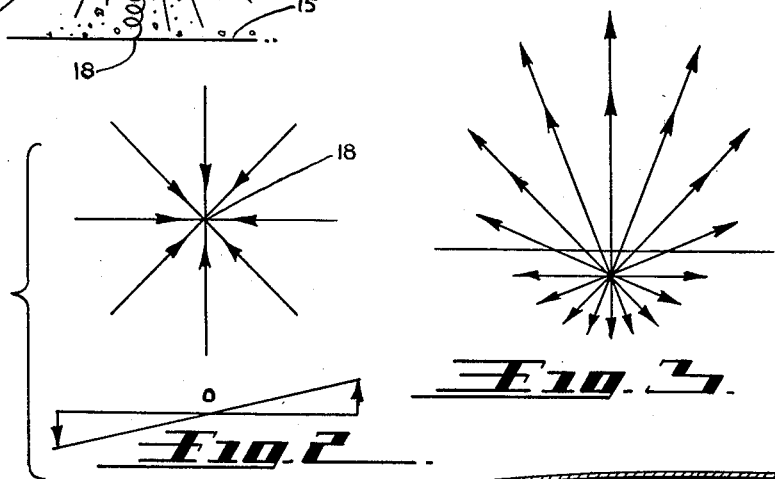
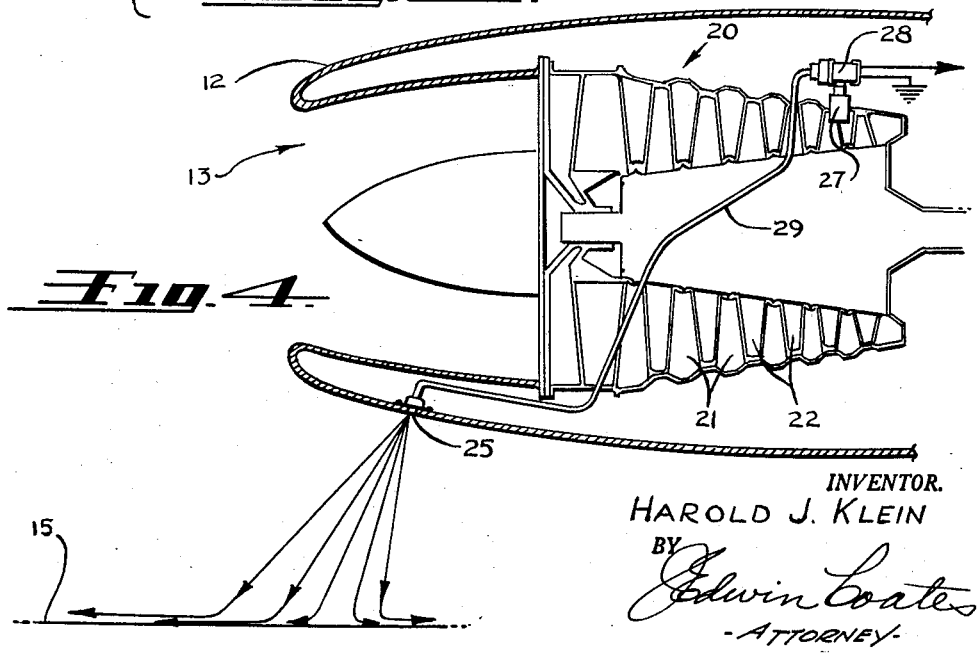
INVENTOR.
HAROLD J. KLEIN
BY
Edwin Coates
-ATTORNEY- Dec. 1, 1959    H. J. KLEIN    2,915,262
VORTEX INHIBITOR FOR AIRCRAFT JET ENGINES
Filed Sept. 26, 1957    2 Sheets-Sheet 2
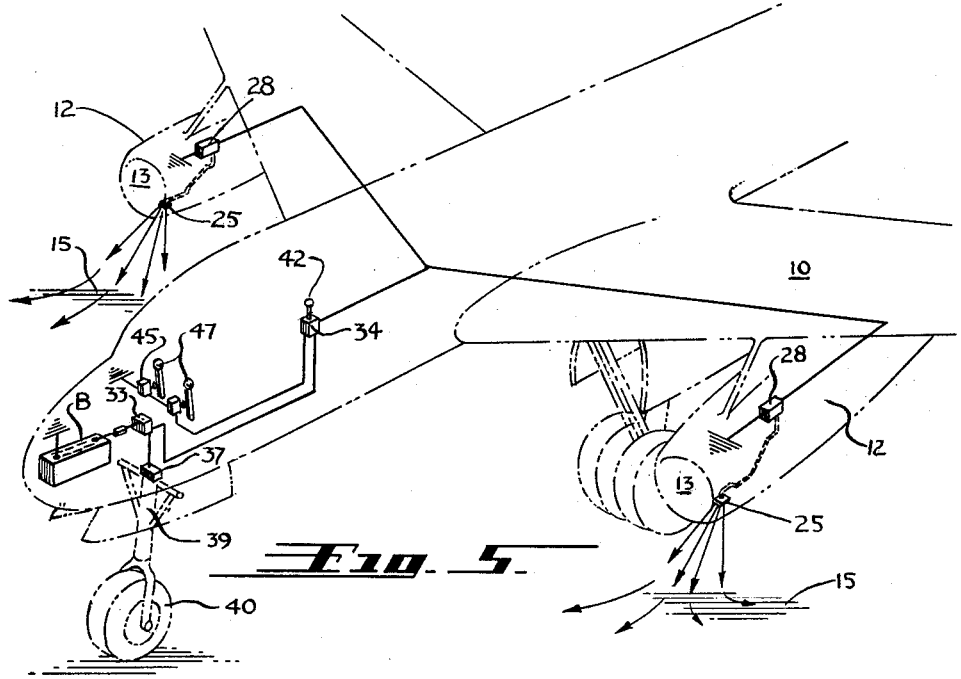
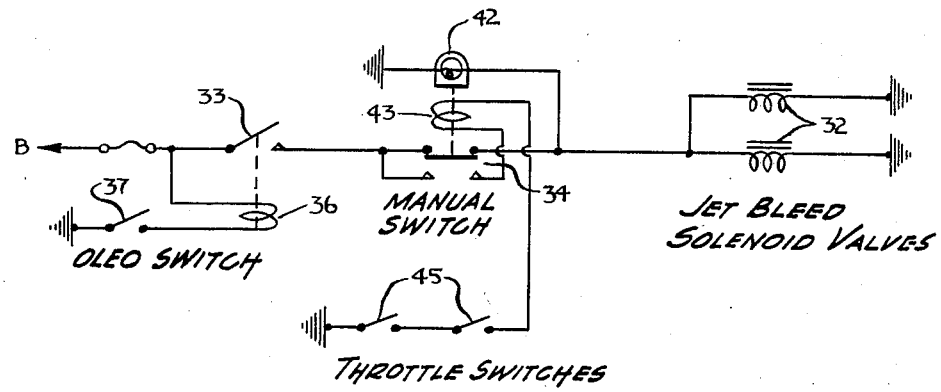
INVENTOR.
HAROLD J. KLEIN
BY
*Edwin Coates*
ATTORNEY.

United States Patent Office 2,915,262
Patented Dec. 1, 1959

2,915,262

VORTEX INHIBITOR FOR AIRCRAFT JET ENGINES

Harold J. Klein, Los Angeles, Calif., assignor to Douglas Aircraft Company, Inc., Santa Monica, Calif.

Application September 26, 1957, Serial No. 686,510

7 Claims. (Cl. 244—74)

This invention relates to power plants and more particularly to internal combustion reaction type engines including ducted fluid current motors for supplying combustion supporting gases to the combustion chambers of the engines.

In present day reaction type engines, especially those which are mounted on aircraft for propulsion thereof, it is required that large quantities of air be supplied thereto to support combustion and the flow of such quantities through one or more relatively small inlets results in flow velocities of such magnitude as from 300 to 600, and higher, feet per second. It is well recognized and readily apparent that when foreign objects such as gravel, debris, small metallic parts and other material of similar nature are projected into the high velocity inflow to the engine the probability is great that such foreign objects will be carried into the engine. In those engines employing rotary impellers or compressors to induce the flow of air into the inlet, such impellers revolve at a high rate, for example 10,000 revolutions per minute, and at such rate the balance of impeller is critical. The collision between ingested foreign objects and the impeller can readily damage the impeller to such an extent as to render it unbalanced which in some instances can result in destructive vibration. Even though the damage to the impeller does not lead to destructive unbalance or the damage is inflicted on other parts of the engine, such as the stator blade portion of the compressor, such damage must be repaired to insure economic and efficient engine operation and to also safeguard against propagation of the damage which would result in subsequent engine failure.

There are two principal causes of foreign articles being projected into the inlet flow to a reaction engine, one of which is independent of the engine operation, such as being thrown thereinto by the discharge gases from a nearby operating engine. The second of these causes is the projection of foreign articles into the inlet flow which occurs upon the formation of a vortex extending from the ground surface to the engine inlet. It is to the elimination of the second of these causes that this invention is primarily directed.

The phenomenon of vortex formation occurs frequently in nature in various magnitudes ranging from destructive tornadoes to meandering dustdevils. The vortex which occurs beneath the inlet of a jet or reaction type engine is physically identical to the vortex caused entirely by the forces of nature, the only difference existing, being one of causation, is that the vertical component is created in one instance by the upflow of air being aspirated by the engine and, in nature, by updrafts of warm air or vertical flow between relatively unstable strata of different densities. As is quite apparent there is a vertical flow of air beneath the air inlet of a jet type engine even though a vortex has not formed but it has been observed that the vertical flow, in the absence of a vortex, will not pick up even the smallest particles, other than such material as dust or the like, from the ground when the jet inlet is, for example, four or more feet above ground. When however circulatory forces about a vertical axis immediately in front of the inlet are superimposed on the vertical upflow of air from the ground to the jet engine inlet a vortex will immediately form and such vortex will project such objects as pebbles, nuts, bolts, small metal scraps and others upwardly whereupon they may be drawn into the engine inlet. The intensification of either or both the vertical upward flow of air or the circulatory flow thereof will increase the magnitude and power of the vortex and resultantly increase its ability to project larger and more dense objects upwardly to the air inlet.

Heretofore efforts have been directed along two lines of approach to a solution for preventing foreign objects from entering jet engine inlets when such engines are operating near the ground. The first of these approaches does without question offer an ideal solution and involves the removal of all foreign objects on the ground by such means as huge self propelled vacuum type cleaners. The magnitude of labor and equipment involved in such an undertaking has resulted in a general non-acceptance of this solution to the problem. The second line of approach has been to filter the air as it enters the engine air inlet. This involves the placement of a grille or screen over the engine inlet and will of course effectively prevent passage of objects into the engines. The screens that have been installed on aircraft engines have however in and of themselves created problems more serious than the problem they were to overcome. These screens seriously affect the efficiency of engine operation by reducing flow through the air inlet and have in some installations reduced engine output by as much as eight percent. Under icing conditions these screens have been known to have become ice encrusted to a degree at which full engine failure was experienced. Corrective measures have been taken to reduce these shortcomings of screens and essentially consisted of mounting the screens in such a manner they could be retracted away from the air inlet after the aircraft was in flight and no longer endangered by debris on the ground. Being retracted, the screens were no longer in position to impede air flow to the engine but this was still far from the perfect solution because it was discovered that in the act of retracting as much as fifty percent of the objects filtered became dislodged and entered the engine. Thus by the use of retractable screens the entry of foreign objects was not prevented but was merely delayed.

This invention involves an entirely new and different approach to the problem of maintaining reaction type jet engines free from solid materials that would normally be drawn in from the surface of the ground. The principle of operation of this invention works neither to filter the air flowing into the engine inlet nor to remove debris from the vicinity of the engine but rather to disturb the pattern of air flow on the ground surface so as to establish a condition under which a vortex cannot form between the ground and the engine inlet. As has been stated, in the absence of a vortex the upward vertical flow of air induced by the pumping action of a jet engine's fluid current motor or compressor, when the air inlet is four or more feet above the ground, as invariably is the case on aircraft mounted jet power plants, will not carry with it or project upwardly any material that would damage the engine.

The formation of an undesirable vortex between the ground and engine air inlet requires that there exist a point of stagnation of the air flow immediately adjacent the ground surface and on this point there is a convergence of omnidirectional air flow parallel to the ground in a manner similar to a sink, thence upwardly to the engine air inlet. By eliminating this sink the presence of a vortex is precluded or, more accurately stated, the point at which a sink could form is moved horizontally away from the air inlet to a point at which the vertical upflow of air will not, when circulatory forces are superimposed thereon, create a vortex.

This invention displaces the point of stagnation on the ground by establishing a flow pattern parallel to the ground which is the direct opposite of the sink, that is, a downward flow of air is directed toward the ground and upon striking the ground the flow is deflected outwardly in substantially all directions or, depending on the angle of incidence of the flow, is deflected outwardly in fan form at an included angle in the approximate range of 130° to 170°. This range may be varied substantially depending on the angle of incidence of the deflecting air flow with the ground and the quantity of air in the deflecting flow, both of which are selected in accordance with the fore and aft point along an axis on the ground parallel to the horizontal axis of the air inlet at which the flow strikes the ground surface.

Any of several supplies of pressurized gases may be utilized to establish the deflecting source. An independent air compressor may be adopted but since it has been established that the quantity of air necessary to displace the sink an adequate distance is a finite and low proportion of the air flow through the engine inlet, that is, in a range of one tenth of one percent (.1%) of engine air, it is very convenient and acceptable to use bleed air from the engine compressor. While the use of bleed air from the engine results in lower engine output, the deflecting flow is controlled in such a manner that it is discontinued when the aircraft is in flight or is cut off or discontinued when the air speed relative to the aircraft is above the minimum at which a vortex can form. This minimum is approximately 15 to 25 miles per hour depending on the rate of engine air intake and the vertical distance above the ground of the inlet.

In aircraft employing jet engines mounted in pods slung beneath the aircraft wing, the vortex deflecting air stream may be directed toward the ground by a flow confining and directing nozzle mounted on the underside of the pod at a point slightly aft of the engine air inlet. In other types of engine installations a convenient nozzle location may be appointed, it being borne in mind that such location should be adapted to minimize the vertical distance between the ground and the nozzle to minimize mixing of the deflecting stream with atmospheric air during the flow of the stream to the ground and thereby maintain the efficiency thereof. With the knowledge obtained from extensive observations that only vortices from the ground at points directly below or forward of the inlet, i.e. upstream of the air entering the engine inlet, lift objects into the air which are subsequently drawn into the inlet, the nozzle is directed downwardly and forwardly at an angle in the range of 15° to 25° from the vertical so that the deflecting flow, sometimes called the "blowaway jet," strikes the ground at a point approximately vertically below the engine inlet whence the major portion of it spreads in fan form across and parallel to the ground in a direction upstream of the air flow into the engine inlet.

Whether bleed air from the engine, the flow of which may be conveniently controlled by a solenoid valve, or an independent compressor is used as a source of the blowaway jet stream, there is no necessity that such source be energized when the aircraft is in flight or when the aircraft has attained airspeed in excess of 15 to 25 miles per hour. It is therefore here provided that at all times when the aircraft is in flight the blowaway jet is turned off automatically by such means as a switch operated when the load on the ground wheels is removed. A further control is also provided whereby a flight crewman can manually turn the source off when he observes the airspeed of the craft to be above the maximum at which a vortex could form. As here employed the landing or ground gear switch also acts as a reset device so that once the aircraft is airborne the system is conditioned so that the blowaway jet immediately turns on when the craft returns to the ground.

A fuller understanding of the invention will be obtained from a knowledge of the accompanying drawings and description of one preferred embodiment thereof. In the drawings:

Figure 1 is a side elevation view of a jet engine pod supported by and below the wing of an aircraft, and between the engine air inlet and the ground is shown a vortex the elimination of which this invention has as its primary purpose;

Figure 2 is a graphical representation of the air flow pattern in a horizontal plane at ground level which accompanies a vortex;

Figure 3 is a graphical representation of the horizontal ground level flow established by the blowaway jet of this invention which when superimposed on the normal flow shown in Figure 2 will prevent vortex formation;

Figure 4 is a fragmentary side sectional view of an engine pod showing the compressor portion of the jet engine and the ducting from the bleed outlet to the blowaway jet nozzle;

Figure 5 is a perspective view of a jet engine propelled aircraft showing the layout of the control for the blowaway jet; and Figure 6 is a schematic of the electric control system for the blowaway jet.

Now with reference to the drawing, wherein like reference numerals represent corresponding parts in the various figures, in Fig. 1 there is shown supported by and beneath aircraft wing 10 a typical reaction type jet engine pod 12 having at its forward end, at the left as viewed in Fig. 1, an air inlet 13 through which is drawn external atmospheric air to support combustion within the engine housed by pod 12. Present day engines vary in air flow through their inlets from 80 to 240 pounds per second which, depending on the area of their inlets, results in air flow rates ranging from 300 to 600 feet per second at the inlet. This enormous flow of air, especially when the aircraft is at rest or moving slowly along the ground, will induce air movement from all points fore and aft, above and below the pod 12 in the vicinity of the inlet. In Fig. 1 the inlet 13, in a practical application, is spaced approximately four feet above the ground surface 15. Under certain wind conditions circulation flow about a vertical axis near inlet 13 is imposed on the upward flow of air toward inlet 13 with the resultant formation of a vortex 17 extending from the ground surface 15 to the inlet 13.

In the absence of a vortex, the lifting force exerted on the ground surface 15 by the inflow of air to the engine pod 12, when the engine is operating at about 80% of its rated output, has been measured at less than one pound. Under identical operating conditions when a vortex forms, in a position approximately that shown in Fig. 1, the lifting force on the ground surface 15 increased to an average in the range of forty pounds. That force of less than one pound has been observed to pick up only very light particulate material such as ordinary dust. When the lifting force of the vortex was exerted on pebbles, small nuts and bolts, and pieces of scrap metal material lying on the ground surface 15, such objects, while not being usually carried by the vortex directly into the inlet, were projected vertically into the main horizontal flow to inlet 13 and carried thereby into the engine.

In Fig. 2 are vector diagrams of the air flow at the ground surface 15 which, when combined with the upward flow to inlet 13, results in the formation of the vortex 17. In the upper diagram of Fig. 2, it is shown that the air flows from all directions toward a central point of stagnation 18, in the manner of a sink and from such central point 18 the air rises vertically into the inlet 13. The lower diagram in Fig. 2 represents the circulation flow which is superimposed on the flow pattern shown on the upper diagram of this Fig. 2 with the indicated point of zero velocity coinciding with the point of stagnation 18.

This invention operates to establish an artificial flow across ground surface 15 to preclude the omnidirectional flow to a point of stagnation shown in the upper diagram of Fig. 2. More accurately stated, the artificial flow is established to preclude the formation of a sink forward of the inlet 13 in a region at which the upward flow of air to the inlet is strong enough to establish and support a vortex. As previously stated, vortex 17 does not usually carry foreign objects directly to the inlet but rather projects or throws the objects upwardly and those which are intercepted by the generally horizontal flow to the inlet are thereby carried into the engine. It has thus been determined that vortices that form from ground surface 15 at a point aft or downstream of the inlet 13 (to the right of inlet 13 as viewed in Fig. 1) are not to be expected to cause the engine to aspirate foreign objects and therefore there is no necessity to provide corrective measures for such vortices.

Referring now to Fig. 4, there is shown within pod 12 a multistage compressor 20 of a jet engine including a series of stator blades 21 and rotor blades 22. In the usual operation of the engine, this compressor 20 is driven by the turbine section (not shown) of the engine and has as its purpose the supplying of air to the combustor (not shown). It is especially on the blades 21 and 22 that damage is inflicted when foreign objects are drawn through inlet 13. The artificial flow across the ground surface is established by emitting a high pressure stream of gas through a nozzle 25, here shown as being located on the under side of pod 12 immediately aft, to the right as viewed in Fig. 4, of inlet 13. The nozzle 25 has a main discharge axis canted forwardly at the appropriate angle, in the range of 15° to 25° from the vertical, so that such axis intersects the surface of the ground 15 at a point approximately vertically below the lip of inlet 13. Since the compressor 20 provides a convenient source of pressurized air, and affords another desirable advantage hereafter defined, a portion of the air from compressor 20 is bled off through outlet 27 which is controlled in "on" and "off" positions by a solenoid operated valve 28. From this valve 28 the pressurized air is conducted directly to nozzle 25 by a section of tubing 29. Since it is desirous that gases ejected through nozzle 25 have a high energy content, the bleed outlet is preferably located at a later stage of compressor 20.

In Fig. 3 there is a vectorial representation of the fan form air flow pattern across the surface 15 of the ground which is established when the air stream emitting from nozzle 25 strikes the ground 15 and is deflected thereacross. In this Fig. 3 the longer flow lines extending upwardly are, with respect to the fore and aft horizontal axis normal to inlet 13, directed forwardly or upstream of the inlet 13 and the source or point from which all these flow lines emanate is directly below and slightly aft of the center of inlet 13. The cross or horizontal line in Fig. 3 shows the approximate line of intersection of a plane normal to ground surface 15 in which inlet 13 lies.

Inasmuch as the distance forward of the inlet at which the vertical flow of air (when combined with horizontal flow patterns such as shown in Fig. 2) will be adequate to form and sustain a vortex varies as a function of the mass and velocity of air aspirated by compressor 20, it is beneficial to utilize compressor bleed air as a source for pressurized gas directed through nozzle 25. By so employing bleed air, as the inflow of air through inlet 13 increases, the quantity and pressure of air bled through outlet 25 increases. This increase in bleed air flow increases the area on ground surface 15 over which the blowaway jet emitting from the nozzle is deflected for establishing a vortex preventing artificial flow. In this manner a self-compensating or adjusting feature is afforded without involving any complex system such as would be required if a source of pressurized gas independent of the jet engine were employed.

In Figs. 5 and 6 is a schematic showing of one control system for effecting flow of air through nozzle 25. Even though the quantity of air led off from compressor 20 through bleed outlet 27 is only in the range of .1% of the weight of gases flowing through the compressor 20, it is desirable to maintain engine efficiency at the highest possible level. To accomplish this purpose the control system for opening and closing the solenoid bleed valve 28 functions, in the use of the invention on aircraft, to automatically close valve 28 at all times when the aircraft is in flight. A manual switch 34 is also placed in the control circuit so that a crew member may shut off valve 28 at any desired time. In the event, however, that the aircraft engines are not in preselected condition of operation, flow through valve 28 will resume as soon as digital pressure on the manual switch 34 is relieved. The automatic valve control responsive to aircraft condition serves a further purpose of resetting the control system so as to commence flow through valve 28 when the aircraft subsequently lands.

With particular reference to Fig. 6, solenoids 32 operate to open the normally closed bleed valve 28 and are energized by a source of electrical energy such as battery B. In the circuit between solenoids 32 and battery B are series arranged normally open single pole switch 33 and double pole, double throw switch 34 normally completing the circuit to solenoids 32. Normally open switch 33 is closed by the action of solenoid 36 which is energized by switch 37. In this application of the invention switch 37 is mechanically connected to the aircraft's oleo strut 39 so that when the weight of the aircraft is on its nose wheel 40 switch 37 is closed and when the wheel 40 is relieved of weight thereon the oleo strut 39 moves to open switch 37.

The second switch 34 normally completes the circuit to solenoids 32 and may be manually moved by illuminated button 42 to its other or down (as seen in Fig. 6) position at which it is closed with respect to hold solenoid 43. Serially arranged in the circuit to solenoid 43 are further switches 45, 45 moved respectively in response to the motion of throttle handles 47, 47, one of which regulates the fuel feed to the engine in each of pods 12. Each of these switches 45 is open when the corresponding throttle handle 47 is moved to retard the engine speed and is closed when handle 47 is moved to advance the engine speed. The switch operating button 42 is internally illuminated by a tap from the line to the valve solenoids 32. By this arrangement the button 42 will be lighted at all times when the solenoids 32 are energized and the light will be extinguished when the circuit to valve solenoids 32 is open.

With this combination of manual switch 34 and throttle switches 45, when oleo switch 37 is closed, as when the aircraft is on the ground, the flow of air through bleed valve 28 may be cut off by depressing button 42 but in the event either or both throttle handles 47 are in engine retarding position, the solenoid 43 will be deenergized so that when button 42 is released the circuit to the valve solenoids 32 is again completed to open valves 28. The manual switch 34 is provided for the principal purpose of enabling the discontinuance of air emission through nozzles 25 when the aircraft, while still on the ground, has accelerated to a speed at takeoff at which vortices to the inlets 13 are not likely to form. Under normal take off conditions the throttle handles 47 will be advanced, thus closing switches 45. When it is observed that the aircraft has attained a preselected speed, button 42 may be depressed, thus energizing solenoid 43 which will hold switch 34 in circuit open condition with respect to solenoids 32. When the aircraft is airborne, switch 36 will open to in turn open the circuit through switch solenoid 43 to reset switch 34. The circuit is thus conditioned so that when the aircraft again lands and closes switch 33, the blowaway jet emitting through nozzles 25 is placed in operation.

Although only one embodiment of a control system is herein shown and described, it should be apparent that many other arrangements may be adopted to control the flow of air through nozzle 25. As an example the system shown in Fig. 6 can be modified by eliminating switch 34 so that flow of air through nozzle 25 is established whenever the aircraft is on the ground.

Even though the nozzle 25 is shown in the drawings as having a specific location with respect to the pods 12, it is to be remembered that the position of nozzle 25 may be varied. The location and size of this nozzle 25 is optional in that any combination of these factors is acceptable so long as the artificial flow established across the ground surface is strong enough to preclude the formation of a vortex.

It is to be understood that the invention is susceptible to other changes and is not limited to the one preferred embodiment herein shown and defined.

I claim:

1. An aircraft including a reaction type gaseous combustion engine; means for directing combustion supporting gases to the engine and including a forwardly directed air inlet receiving atmospheric air; landing gear for supporting the aircraft on the ground, said aircraft when supported by said landing gear having the air inlet spaced above the ground a distance whereat, when the engine is in operation and the relative velocity of atmospheric air between the air inlet and a point on the ground below the air inlet is negligible, the flow of air through the inlet induces omni-directional flow of air at the ground converging on said point and thence upwardly to the inlet, said point being a point of stagnation, whereby, when circulation forces are imposed on the air about a substantially vertical axis rising from said point, a vortex from the ground to the inlet will be formed; a source of pressurized fluid; fluid directing means in communication with said source and including a restricted outlet below and aft of said inlet, the outlet having a downwardly directed axis of discharge sloping forwardly and directing the pressurized fluid toward the ground at a point substantially vertically below the inlet, the size of the outlet and pressure of said pressurized fluid having a predetermined ratio to effect an uninterrupted stream-like flow of fluid to the ground from said outlet which flow upon striking the ground is dispersed in fan-form across an area on the ground to a distance beyond which a vortex from the ground to the inlet will not form.

2. An aircraft including a reaction type gaseous combustion engine; an enclosure within which said engine is housed, means for directing combustion supporting gases to the engine and including a forwardly directed air inlet receiving atmospheric air; landing gear for supporting the aircraft on the ground, said aircraft when supported by said landing gear having the air inlet spaced above the ground a distance whereat, when the engine is in operation and the relative velocity of atmospheric air between the air inlet and a point on the ground below the air inlet is negligible, the flow of air through the inlet normally induces omni-directional flow of air at the ground converging on said point and thence upwardly to the inlet, said point being a point of stagnation, whereby, when circulation forces are imposed on the air about a substantially vertical axis rising from said point, a vortex extending from the ground to the inlet will be formed; a source of pressurized fluid; fluid directing means in communication with said source and including an outlet directing the pressurized fluid to the exterior of the enclosure and toward the ground at a point below the inlet, the size of the outlet and pressure of the fluid having a ratio to effect an uninterrupted stream-like flow of fluid to the ground which flow upon striking the ground is dispersed in fan-form across an area on the ground including the normal point of stagnation to a distance therebeyond at which a vortex from the ground to the inlet will not be formed and sustained.

3. A reaction type engine requiring the supply thereto of substantial quantities of free atmospheric air; an enclosure for said engine including duct means having a forwardly facing inlet end open to and receiving the atmospheric air; impeller means in flow communication with the duct means and inducing the flow of air into the inlet end of the duct means, said flow of air, when the inlet is proximate the surface of the ground, normally creating omni-directional flow of air across the surface of the ground toward a point of stagnation thence upwardly to the inlet end whereby when circulation forces about a vertical axis through the point of stagnation are imposed on the atmospheric air an upwardly directed vortex is formed; a source of pressurized fluid; and means directing the pressurized fluid from the source to a discharge point located exteriorly of said enclosure; a nozzle at the discharge point receiving the pressurized fluid and directing the flow thereof downwardly and forwardly toward the ground whereat it is deflected to flow in fan form in a plane parallel to the ground, said flow intercepting the vertical axis through the normal point of stagnation whereby to preclude the formation of said point of stagnation.

4. In a machine requiring the supply thereto of substantial quantities of free atmospheric air, duct means having a forward inlet end open to and receiving the atmospheric air; air compressor means in flow communication with the duct means and inducing the flow of air into the inlet end of the duct means, said flow of air, when the inlet is proximate the surface of the ground, normally creating omnidirectional flow of air across the surface of the ground toward a point of stagnation thence upwardly to the inlet end whereby when circulation forces about a vertical axis through the point of stagnation are imposed on the atmospheric air an upwardly directed vortex is formed; enclosure means housing said compressor means a bleed outlet receiving air from said compressor means; and means directing the air from the bleed outlet to a discharge point on the exterior of the enclosure means; nozzle means at said discharge point directing the air from the bleed outlet substantially vertically downwardly toward the ground whence upon striking the ground the fluid is deflected to a flow across the surface of the ground in fan form, said flow sweeping across the normal point of stagnation whereby to preclude the formation of an upwardly directed vortex.

5. An aircraft including a reaction type gaseous combustion engine; means for directing combustion supporting gases to the engine and including an air inlet receiving atmospheric air; landing gear for supporting the aircraft on the ground, said aircraft when supported by said landing gear having the air inlet spaced above the ground a distance whereat a vortex from the ground to the inlet may be formed; a source of pressurized fluid; fluid directing means in communication with said source and including a restricted outlet below and aft of said inlet directing the pressurized fluid toward the ground forwardly with respect to the inlet, the size of the outlet and pressure of the fluid having a predetermined ratio to effect an uninterrupted stream-like flow of fluid to the ground which flow upon striking the ground is dispersed in fan-form across an area on the ground to a distance beyond which a vortex from the ground to the inlet cannot be formed and sustained; and means to control the source of fluid to effect the termination of flow through the outlet when the aircraft is aerodynamically supported in flight, the latter said means being inactive at all times when the aircraft is supported on the ground.

6. An aircraft having a reaction type engine requiring the supply thereto of substantial quantities of atmospheric air; enclosure means for said engine including duct means having a forwardly facing inlet end open to and receiving the atmospheric air; impeller means in flow communication with the duct means and inducing the flow of air to the engine through the inlet end of the duct means, said flow of air, when the inlet is proximate the surface of the ground, normally creating omnidirectional flow of air across the surface of the ground toward a point of stagnation thence upwardly to the inlet and whereby when circulation forces about a vertical axis through the point of stagnation are imposed on the atmospheric air an upwardly directed vortex is formed; nozzle means exteriorly of said enclosure means and having a downwardly directed discharge axis intersecting in a forward direction a vertical axis through the inlet end at a point below the inlet; a bleed outlet means receiving air from the impeller means; duct means between the bleed outlet means and the nozzle means; and means to discontinue flow of air through the bleed outlet means when the aircraft is aerodynamically supported in flight and to resume air flow through the bleed outlet means at all times when the aircraft is supported on the ground surface.

7. A reaction type engine requiring the supply thereto of substantial quantities of atmospheric air; duct means having a forwardly facing inlet end open to and receiving the atmospheric air; impeller means in flow communication with the duct means and inducing the flow of air to the engine through the inlet end of the duct means, said flow of air, when the inlet is proximate the surface of the ground, normally creating omnidirectional flow of air across the surface of the ground toward a point of stagnation thence upwardly to the inlet and whereby when circulation forces about a vertical axis through the point of stagnation are imposed on the atmospheric air an upwardly directed vortex is formed; nozzle means having a discharge axis directed to a point approximately vertically below the inlet end; and a source of pressurized air in communication with the nozzle means, said source including a bleed outlet extracting a substantially constant proportion of the flow of air to the engine whereby as the flow of air to the engine increases the flow of air through the nozzle increases.

References Cited in the file of this patent

UNITED STATES PATENTS

| | | |
|---|---|---|
| 2,418,801 | Baumann | Apr. 8, 1947 |
| 2,520,697 | Smith | Aug. 29, 1950 |
| 2,600,302 | Kinsella | June 10, 1952 |
| 2,801,044 | Bowie | July 30, 1957 |

FOREIGN PATENTS

| | | |
|---|---|---|
| 1,012,339 | France | July 8, 1952 |